W. B. CROSSLAND.
SPEED ALARM.
APPLICATION FILED JULY 13, 1914.
1,136,410.
Patented Apr. 20, 1915.
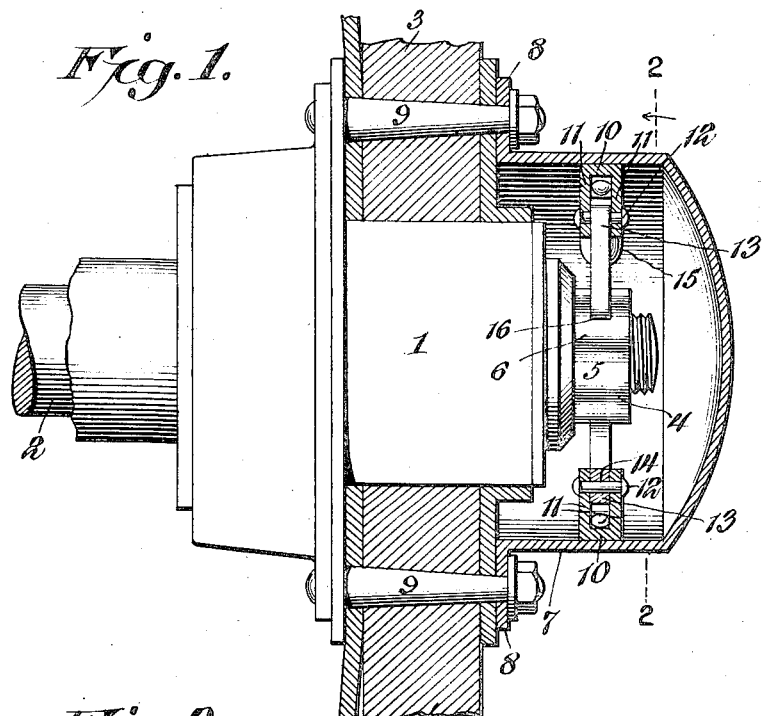
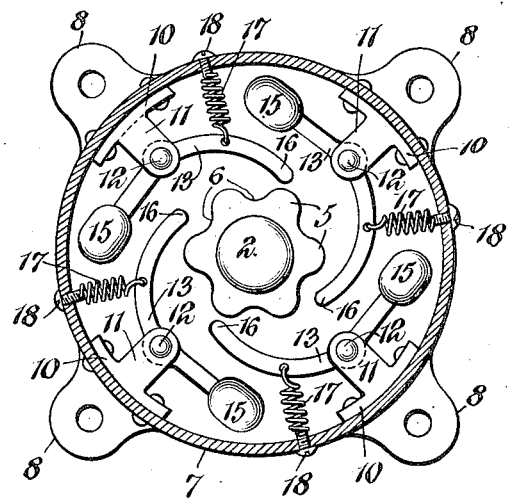
WITNESSES
Howard D. Orr
F. T. Chapman
William B. Crossland, INVENTOR,
BY E. G. Siggers
ATTORNEY

UNITED STATES PATENT OFFICE.

WILLIAM BLACKNELL CROSSLAND, OF NEWPORT, ARKANSAS.

SPEED-ALARM.

1,136,410.   Specification of Letters Patent.   Patented Apr. 20, 1915.

Application filed July 13, 1914. Serial No. 850,730.

*To all whom it may concern:*

Be it known that I, WILLIAM B. CROSSLAND, a citizen of the United States, residing at Newport, in the county of Jackson and State of Arkansas, have invented a new and useful Speed-Alarm, of which the following is a specification.

This invention has reference to improvements in speed alarms, and its object is to provide means whereby an obtrusive sound is produced if the speed shall exceed a predetermined amount.

The speed alarm is designed more particularly for use in connection with automobiles, and is so constructed that it may be placed on a relatively conspicuous part of the automobile, so that the sound produced is not muffled and the device may be readily located by an observer.

The present invention comprises a sound giving structure adapted to replace the usual protecting cap employed to cover the nut holding one of the wheels of the automobile to the axle, and while the present invention is adapted to any one of the wheels of the automobile, it is usually associated with one of the front wheels. The wheel cap is in accordance with the present invention suitably shaped and the ordinary nut is replaced by a special nut, while within the cap there is located a series of hammers or knockers movable by centrifugal force against constraining means into position to be engaged at one end by the special nut, while the other end will then tap the cap in a manner to produce an obtrusive noise. The arrangement is such that the tapping elements are normally inactive, but when the speed of the wheel reaches a predetermined limit, the heads of the tappers are then close to or in actual contact with the inner wall of the cap but are vibrated with respect thereto to deliver rapid blows by engagement of the special nut with the other ends of the tappers, said tappers being arranged to be rocked by the nut.

By suitably proportioning the parts, excessive speed will cause the production of an obtrusive noise giving warning to the occupants of the automobile that the speed limit is being exceeded, and also warning others of the fact.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a view, partly in elevation, and partly in axial section, of a fragment of the hub portion of a wheel with the invention applied. Fig. 2 is a section on the line 2—2 of Fig. 1 but omitting distant parts. Fig. 3 is a perspective view of one of the knocking elements.

Referring to the drawings there is shown a hub portion 1 of an automobile wheel mounted on an axle 2, but as the structure of the wheel is not material to the present invention these parts are simply shown in elevation, although spokes 3 of the wheel are shown in section, and some other parts of the wheel are also shown in section, but need not be described, since they do not enter into the present invention. Applied to the outer end of the axle 2 is a nut 4 which may serve the purpose of holding the wheel to the axle, thus replacing the nut ordinarily employed for such purpose. The nut 4 is somewhat modified from the ordinary nut in having the periphery formed with rounded teeth or ridges 5 separated by rounded valleys or hollows 6. It is not obligatory that the surface of the nut be shaped as shown, but should be of broken contour for a purpose to be described. In place of the ordinary wheel cap there is provided a cap 7 which may be of somewhat greater diameter than the ordinary cap and serves a similar purpose of protecting the hub portion of the wheel from access of dust and dirt. The cap is provided with ears 8 for the passage of fastening bolts 9, which bolts may be those usually present in different types of wheels for holding the dust cap and other parts in place. The ears 8 and bolts 9 are to be taken as indicative of any means of holding the cap 7 to the wheel and the cap may be changed or modified so far as its shape and the fastening means are concerned to adapt it to different types of automobile wheels.

Secured to the inner wall of the cap 7 so as to be in about the plane of the nut 4 are brackets 10 arranged in a circular series, and in the particular showing of the drawings these brackets are formed with pairs of spaced legs 11 traversed near their outer ends by pivot pins 12. Mounted in each bracket by means of the pivot pin 12 is a lever 13 having a passage 14 about midway of its length for the pivot pin, the lever being capable of rocking on the pin. One arm of the lever, which is shown as a lever of the first order, is formed with or has attached to its outer end a head 15, while the other arm of the lever is bent or curved to one side and terminates in a rounded end 16. Between the pivot passage 14 and the end 16, the lever has attached to it one end of a spring 17, the other end of the spring being secured to a screw 18 threaded through the shell of the cap 7, so that the screw is accessible from the exterior of the shell. By this means the tension of the spring is readily adjusted as desired, and when once properly adjusted the screw may be fixed in the adjusted position by solder or otherwise, thus preventing tampering with the structure by maliciously disposed persons.

When the parts are in proper position, the springs 17 hold the head ends 15 of the levers away from the inner wall of the cap 7, and the other ends 16 out of the path of the teeth 5 of the nut 4, and this condition is maintained when the wheel is turning except that as the speed of the wheel increases centrifugal force causes the heads 15, which are made relatively heavy as compared with the bodies of the levers, to approach the inner wall of the cap 7. The effect of centrifugal force will likewise stretch the springs 17 and when the predetermined speed limit is reached the heads or hammers 15 are close to the inner wall of the cap, while the ends 16 of the levers have moved toward the nut 4 until engaged by the teeth 5. So long as the speed limit is not exceeded the hammers are not moved into contact with the cap even though the ends 16 may be touched by the teeth 5, for until the centrifugal force is sufficient to cause the ends 16 to enter between the teeth 5 and approach the valleys 6 the levers are not vibrated. If the speed limit for which the device is set be exceeded then the centrifugal force exerted is sufficient to cause the ends 16 to move into the space between the teeth 5 so that each tooth will deliver to the end 16 an impulse tending to move the hammer head or tappet 15 away from the inner wall of the cap 7. Under these circumstances the rebound caused by centrifugal force will move the hammer head or tappet toward the inner wall of the cap 7, and the end 16 then enters more deeply into the hollow or valley 6 and to a sufficient extent to cause the hammer head or tappet 15 to strike the inner wall of the cap 7 with a force resulting in a sharp sound or noise. This being produced many times a second by each hammer head or tappet, and the device being provided with a suitable number of such sound devices, there results a continuous succession of sharp noises produced by numerous blows, so that the resultant effect is highly obtrusive and at once directs attention to the sounding device.

By the employment of a sufficient number of sounding elements or tappets together with a rigidly mounted cap, the noise produced on the excess of the predetermined speed may be made so discordant as to attract the attention of the occupants of the automobile above all other noises which may occur at the same time.

The occupants of the vehicle are not only warned to slow down, but are constrained to do so because of the obtrusively disagreeable noise produced, and also because of the attention such a highly disagreeable noise attracts from all others within hearing distance.

By placing the sound producing device upon the hub of the wheel it becomes operative solely by centrifugal force, and without the necessity of any connecting parts whatever, so that the device may be adjusted and sealed with the assurance that it will give an alarm under all circumstances and without liability of failure because of the breaking down of some connecting part, since no connecting parts are employed. Again, the device is always in plain view and the occupants of the vehicle can always assure themselves that the device has not been tampered with, wherefore, it becomes particularly reliable and the occupants of the vehicle may always feel assured that they are within the required speed limit, so long as no sound is produced by the alarm.

The device of the present invention may be employed upon vehicles such as fire apparatus and ambulances where a continuous alarm is desirable. Under such circumstances the device may be adjusted to operate at a much lower speed than when employed to give an alarm for excessive speed. The device when used as a cautionary alarm is set to operate at low speed and then will deliver a warning noise continuously so long as the vehicle is traveling at any emergency speed, such as is employed when fire apparatus is responding to an alarm, or when ambulances and other vehicles are making hurry trips.

It will be understood, of course, that the cap, tappet structures, springs and nut need not follow the showing of the drawings, but may be variously modified in structure from the showing of the drawing without marking a departure from the present invention which provides for the production of an obtrusive noise through the action of centrifugal force and also permits the location of the noise producing device where it may be readily observed at any time and where it is wholly self-contained and no exposed or other connecting parts are needed.

What is claimed is:—

1. An alarm device for moving parts comprising a casing adapted to be attached to a moving part, tappets carried by the casing and adapted to be moved into engagement with the casing by centrifugal force and having a normal constraint away from engagement with the casing, and a relatively fixed member in the casing in the path of the tappet structures when moved toward engaging position with the casing under the action of centrifugal force.

2. An alarm for vehicles comprising a casing constituting a cap member adapted to be attached to the hub portion of a wheel of a vehicle to rotate with the wheel, tappets within and carried by the casing and movable by centrifugal force toward engaging position with the casing, means constraining the tappets to move away from engaging position with the casing, and means on a fixed part of the vehicle and located within the casing and adapted to be engaged by the tappet structures when moved toward the casing under the action of centrifugal force to vibrate the tappets.

3. An alarm device for vehicles, comprising a casing adapted to be attached to the hub portion of a wheel of the vehicle to rotate with the wheel, tappets within and carried by the casing and each comprising a lever structure pivotally mounted on the casing with one end formed into a head or striker in operative relation to the casing, a spring connected with the lever and normally holding the head end away from the casing, and a nut with a toothed periphery located within the casing and normally fixed against rotation, said nut being in the path of the ends of the levers remote from the head ends when the latter are moved by centrifugal force generated by an excess of speed over a predetermined speed.

4. A speed alarm for automobiles comprising a cap member adapted to be applied to the hub portion of a wheel of the vehicle, levers within the cap member and mounted thereon, each lever having a head at one end adapted to be moved by centrifugal force toward the inner wall of the cap and having the other end directed toward the axis of rotation, a spring for each lever constraining its head end away from the cap, and a nut adapted to the axle of the vehicle and provided with a toothed periphery for engagement with the corresponding ends of the levers when the head ends thereof are moved toward the inner wall of the cap member under the action of centrifugal force generated by an excess over a predetermined speed of rotation of the wheel.

5. A speed alarm device for vehicles, comprising a casing having means for its attachment to the hub portion of a wheel of the vehicle, tappet devices within the casing responsive to centrifugal force to move toward the casing, and relatively fixed means within the casing acting in opposition to centrifugal force to cause the rebound of the tappet devices under centrifugal force into engagement with the casing.

In testimony, that I claim the foregoing as my own, I have hereto affixed my signature in the presence of two witnesses.

WILLIAM BLACKNELL CROSSLAND.

Witnesses:
C. H. WATH,
NORMAN C. WOLFF.